(12) United States Patent
Onishi et al.

(10) Patent No.: US 8,005,256 B2
(45) Date of Patent: Aug. 23, 2011

(54) IMAGE GENERATION APPARATUS AND RECORDING MEDIUM

(75) Inventors: Takeshi Onishi, Kanagawa (JP); Takashi Sonoda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1115 days.

(21) Appl. No.: 11/785,324

(22) Filed: Apr. 17, 2007

(65) Prior Publication Data

US 2008/0101699 A1 May 1, 2008

(30) Foreign Application Priority Data

Oct. 27, 2006 (JP) ................. P2006-293327

(51) Int. Cl.
*G06K 9/00* (2006.01)
(52) U.S. Cl. .................... 382/100; 382/181
(58) Field of Classification Search .......... 358/1.1–1.9, 358/1.11–1.18, 3.28, 3.24, 2.1, 450; 382/100; 345/629; 713/176, 193; 283/72, 113, 92, 283/902; 399/366; 380/203
See application file for complete search history.

(56) References Cited

U.S. PATENT DOCUMENTS

| | | | | |
|---|---|---|---|---|
| 7,339,599 | B2 * | 3/2008 | Hayashi | 345/629 |
| 7,599,099 | B2 * | 10/2009 | Tamaru | 358/3.28 |
| 2004/0150859 | A1 | 8/2004 | Hayashi | |
| 2005/0171914 | A1 | 8/2005 | Saitoh | |
| 2007/0030521 | A1 * | 2/2007 | Fujii et al. | 358/3.28 |
| 2008/0307521 | A1 * | 12/2008 | Hosoda | 726/17 |

FOREIGN PATENT DOCUMENTS

| | | |
|---|---|---|
| AU | 498768 B1 | 3/1979 |
| JP | 53-98829 A | 8/1978 |
| JP | 54-74125 A | 6/1979 |
| JP | 9-295484 A | 11/1997 |
| JP | 2001-197297 A | 7/2001 |
| JP | 2001-346032 A | 12/2001 |
| JP | 2003-511761 T | 3/2003 |
| JP | 2004-223854 A | 8/2004 |
| JP | 2005-259108 A | 9/2005 |
| JP | 2006-85679 A | 3/2006 |
| JP | 2006-093902 A | 4/2006 |
| JP | 2006-295519 A | 10/2006 |

(Continued)

OTHER PUBLICATIONS

English Translation of Sadao et al, Two-Dimensional Code Pattern, Two-Dimensional Code Generating Method, Two-Dimensional Code Generator and Printing Medium, Patent Abstract of Japan, Publication No. 2006-085679, Mar. 30, 2006.*

(Continued)

*Primary Examiner* — Samir A Ahmed
*Assistant Examiner* — Mehdi Rashidian
(74) *Attorney, Agent, or Firm* — Morgan, Lewis & Bockius LLP (57) ABSTRACT

An image generation apparatus includes an information acquisition section and an image generation section. The information acquisition section acquires record information to be recorded on a recording medium. The image generation section generates an image including code pattern images and a latent image for checking paper being copied. The code pattern image represents the record information acquired by the information acquisition section. The latent image for checking paper being copied includes second pattern images each having a smaller size than each code pattern image and third pattern images each having a larger size than each code pattern image.

6 Claims, 9 Drawing Sheets

FOREIGN PATENT DOCUMENTS

| | | |
|---|---|---|
| JP | 2006-345383 A | 12/2006 |
| JP | 2006-293327 | 4/2011 |
| WO | WO 01/26032 A1 | 4/2001 |
| WO | WO 01/26033 A1 | 4/2001 |
| WO | WO 01/26034 A1 | 4/2001 |

OTHER PUBLICATIONS

Takashi Sonoda et al., "Image Generation Apparatus, Image Processing Apparatus, Computer Readable Medium and Computer Data Signal," Unpublished U.S. Appl. No. 11/785,330, filed Apr. 17, 2007.

Takeshi Onishi et al., "Image Generation Apparatus, Computer Readable Medium, Computer Data Signal, Information Generation Method, Information Reading System, Electronic Pen and Recording Medium," Unpublished U.S. Appl. No. 11/785,333, filed Apr. 17, 2007.

Takeshi Onishi et al., "Image Processing Apparatus, Computer Readable Medium, and Computer Data Signal," Unpublished U.S. Appl. No. 11/785,329, filed Apr. 17, 2007.

* cited by examiner

| SYNCHRONOUS CODE | X POSITION CODE | X POSITION CODE | X POSITION CODE | X POSITION CODE |
|---|---|---|---|---|
| Y POSITION CODE | INFORMATION CODE | INFORMATION CODE | INFORMATION CODE | INFORMATION CODE |
| Y POSITION CODE | INFORMATION CODE | INFORMATION CODE | INFORMATION CODE | INFORMATION CODE |
| Y POSITION CODE | INFORMATION CODE | INFORMATION CODE | INFORMATION CODE | INFORMATION CODE |
| Y POSITION CODE | INFORMATION CODE | INFORMATION CODE | INFORMATION CODE | INFORMATION CODE |

KANJI CHARACTERS MEANING "ESTIMATION SHEET"

FIG. 8B

KANJI CHARACTERS MEANING "ESTIMATION SHEET"

COPYING AT LOW DENSITY →

FIG. 8C

COPYING AT HIGH DENSITY →

KANJI CHARACTERS MEANING "ESTIMATION SHEET"

IMAGE GENERATION APPARATUS AND RECORDING MEDIUM

CROSS-REFERENCE TO RELATED APPLICATIONS

This application is based on and claims priority under 35 U.S.C. §119 from Japanese Patent Application No. 2006-293327 filed Oct. 27, 2006.

BACKGROUND

Technical Field

The invention relates to an image generation apparatus and a recording medium.

Void paper is a medium (paper) in which a latent image for forgery-proof (latent image for checking paper being copied) is embedded. If an attempt is made to copy the medium (paper) with a copier, a character string or an image such as "copy invalid" appears on a copy, making it possible to identify the copy. Such paper is also used for a certificate of a city office and is widely distributed.

SUMMARY

According to an aspect of the invention, an image generation apparatus includes an information acquisition section and an image generation section. The information acquisition section acquires record information to be recorded on a recording medium. The image generation section generates an image including code pattern images and a latent image for checking paper being copied. The code pattern image represents the record information acquired by the information acquisition section. The latent image for checking paper being copied includes second pattern images each having a smaller size than each code pattern image and third pattern images each having a larger size than each code pattern image.

BRIEF DESCRIPTION OF THE DRAWINGS

Exemplary embodiments of the invention will be described in detail below with reference to the accompanying drawings, wherein.

DETAILED DESCRIPTION

Exemplary embodiments of the invention will be described below with reference to the accompanying drawings.

First, the structure of a code pattern image used in the exemplary embodiment and a pattern image to form a latent image for checking paper being copied will be described. Then, an image generation apparatus for generating pattern images will be described.

<Unit Code Pattern>

Figure 1:
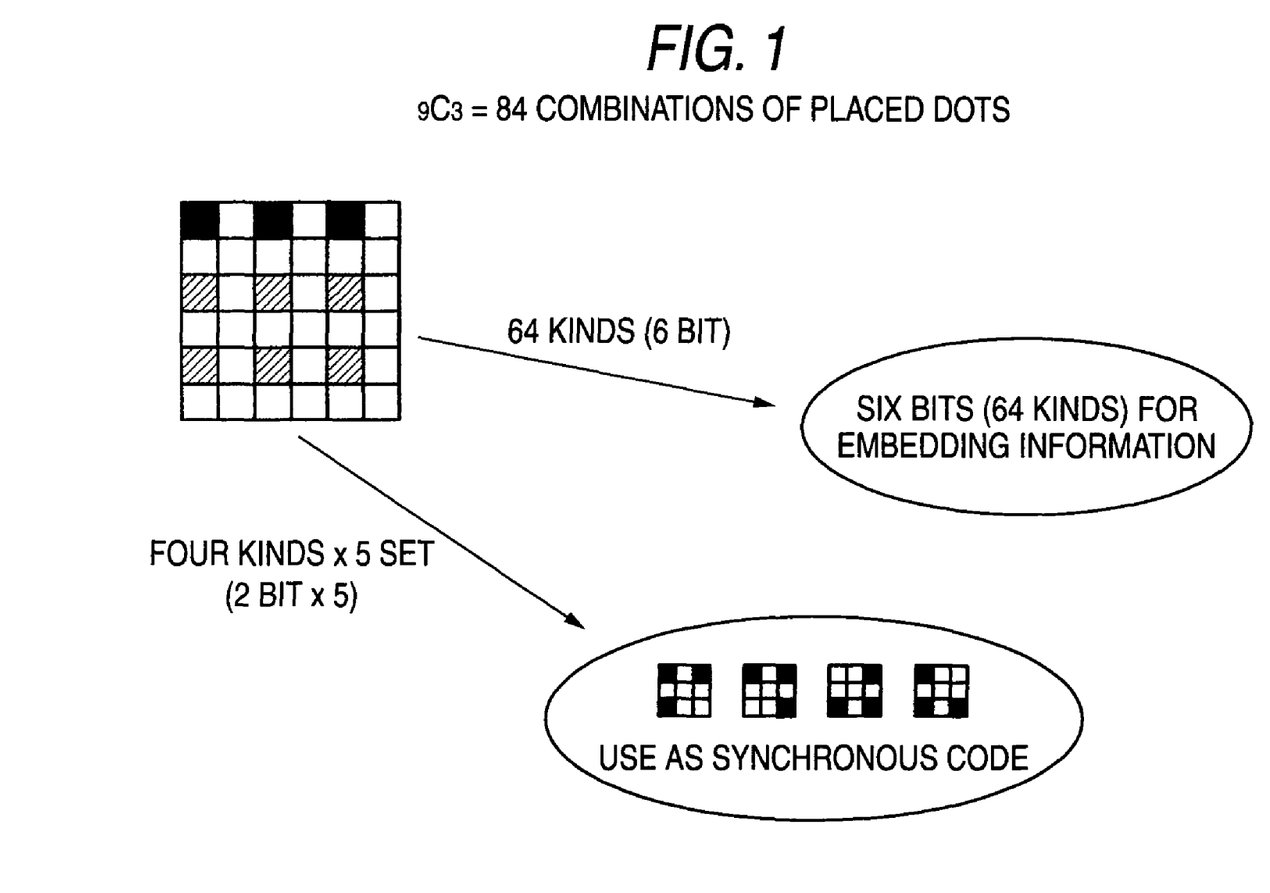
FIG. 1 is a drawing to show an example of a unit code pattern of a code pattern image used in an exemplary embodiment of the invention.

FIG. 1 is a drawing to show an example of a unit code pattern of the code pattern image used in the exemplary embodiment.

In the example shown in FIG. 1, three positions are selected from among nine dot placeable positions having three points in height by three points in width (hereinafter, expressed as "3×3 points"), and dots are placed. In this case, 84 combinations of placed dots that the unit code pattern can take are available ($84={}_9C_3$) (where ${}_mC_n=m!/\{(m-n)!\times n!\}$). If 600-dpi recording is executed, one dot size (size of quadrangle) in FIG. 1 is two pixels in height by two pixels in width (hereinafter, expressed as "2×2 pixels"; 84.6 μm×84.6 μm rectangle on calculation, but dot shape of about ϕ100 μm in recorded toner image because of influence of xerography process). Therefore, the size of the unit code pattern becomes 0.5076 mm×0.5076 mm.

Figure 2:
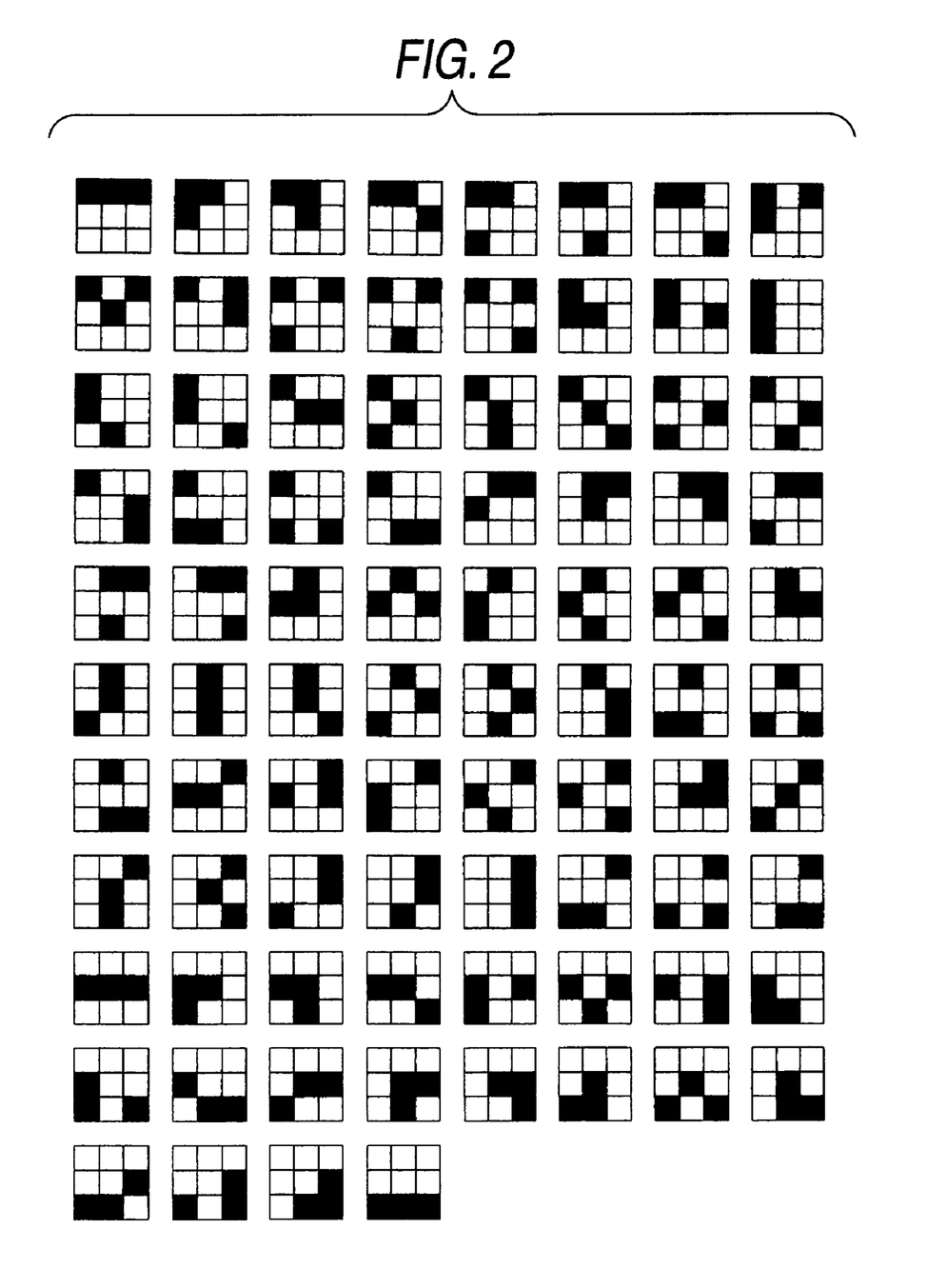
FIG. 2 is a drawing to show 84 combinations of placed dots s that the unit code pattern shown in FIG. 1 can take.
Figure 3A:
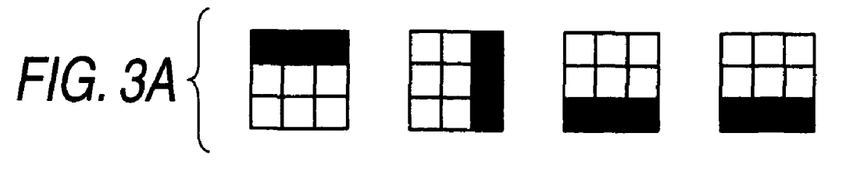
FIG. 3 is a drawing to show examples of four kinds of unit code patterns that can be used as a synchronous code (five sets)
Figure 3B:
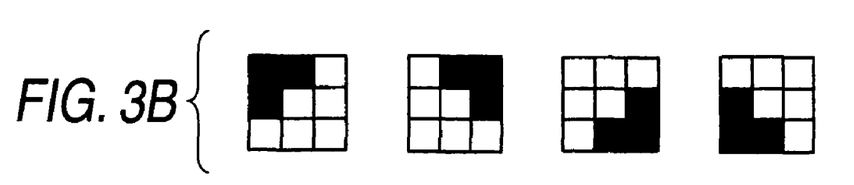
Figure 3C:
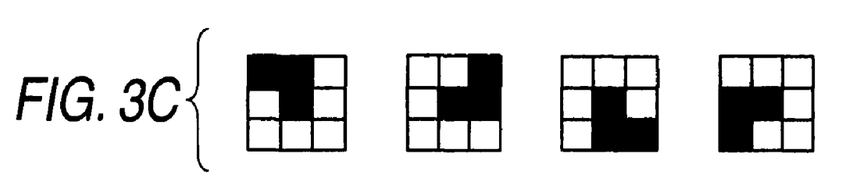
Figure 3D:
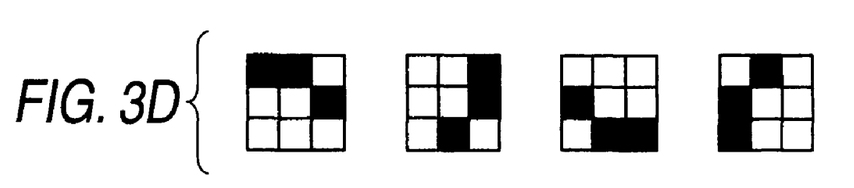
Figure 3E:
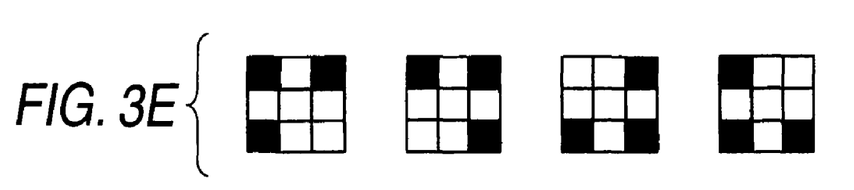

Sixty four of the 84 kinds of unit code patterns ($64=2^6$=six bits) are used as code to embed information (information code). The remaining 20 kinds of unit code patterns are used as a synchronous code for detecting a code block (described later) and detecting the rotation angle of the code block. FIG. 2 is a drawing to show the 84 combinations of placed dots that the unit code pattern in FIG. 1 can take. FIG. 3 is a drawing to show examples of four kinds of unit code patterns that can be used as a synchronous code (five sets). Although space having the same size as the dot size (two pixels) exists between dots forming the unit code pattern as shown in FIG. 1, space between dots is omitted in FIGS. 2 and 4 for simplicity of display.

As the synchronous code, four patterns may be used to detect the rotation angle of a code block in 90-degree units. In this case, five sets of synchronous codes can be created using 20 patterns. Four unit code patterns used as a synchronous code are selected so that they become patterns symmetrical with respect to 90-degree rotation. That is, if any one of the four kinds of unit code patterns is embedded as a synchronous code in generating an image, the rotation angle of the code block (indicating in which direction of 0, 90, 180, and 270 degrees a code block synchronized on a two-dimensional array directs) can be determined and corrected depending on which angle the synchronous code directs, during decoding.

The unit code pattern is not limited to the method of placing dots in three positions among nine positions as shown in FIG. 3. Any number of dots may be placed if it is smaller than nine. For example, to place dots in four positions among nine positions, 126 combinations of placed dots are available ($126={}_9C_4$). Also, the number of dot placeable positions is not limited to nine (three×three) and may be any other number, such as four (two×two) or 16 (four×four), for example.

(Code Block)

Figure 4:
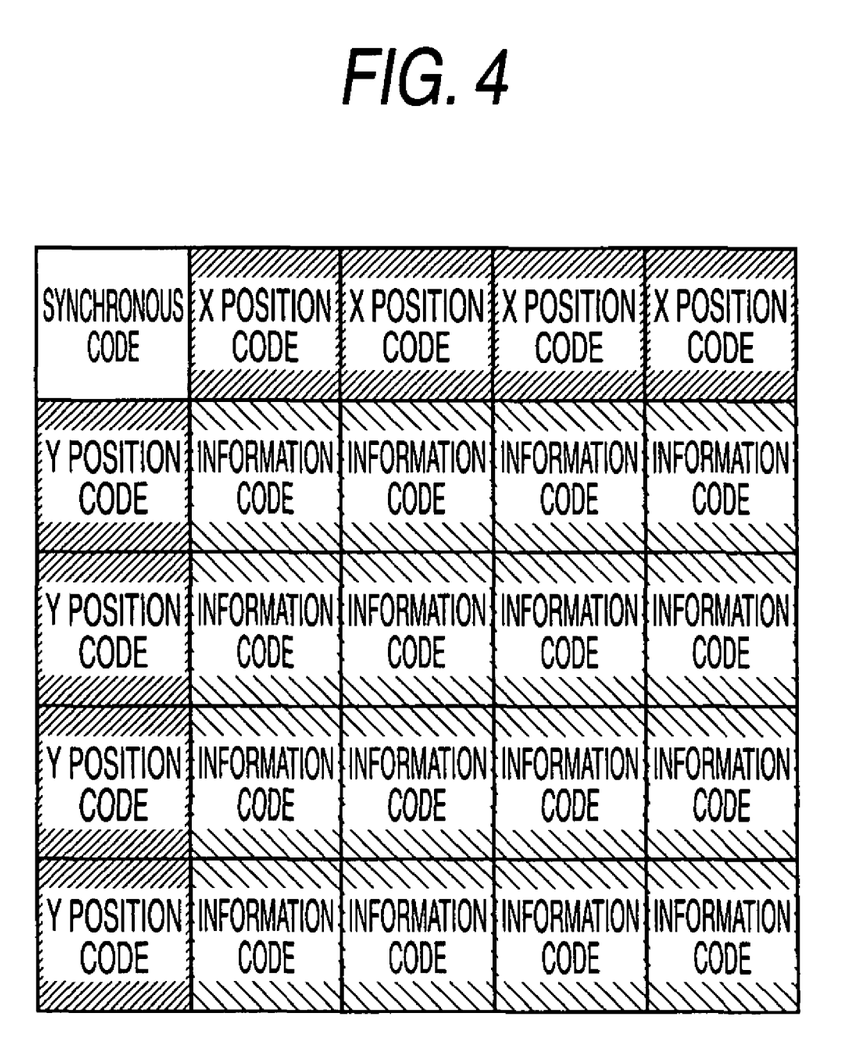
FIG. 4 is a drawing to show an example of a code block used in the exemplary embodiment of the invention.

FIG. 4 is a drawing to show an example of a code block used in the exemplary embodiment.

The code block shown in FIG. 4 is formed by arranging the unit code patterns shown in FIG. 1 as 5×5. The synchronous code shown in FIG. 3 is placed in the upper left corner of the code block. That is, any is selected from among the synchronous codes shown in FIGS. 3A to 3E, and one selected from among the four kinds of unit code patterns contained in the selected synchronous code is placed in the upper left corner of the code block.

In FIG. 4, four unit code patters to the right of the synchronous code and four unit code patters below the synchronous code are used to place position codes. The position code is unit code patterns to represent position information unique to a position on a recording medium on which a code pattern image is formed. In the exemplary embodiment, the Cartesian coordinate system (X-Y coordinate system) is assumed on the recording medium surface and the position is represented by the coordinate values. Then, the position code to the right of the synchronous code is a position code obtained by encoding position information unique to a position in the X direction on the recording medium. A position code below the synchronous code is a position code obtained by encoding position information unique to a position in the Y direction on the recording medium. Each of the X direction position code and the Y direction position code uses four unit code patters and thus, can store 24-bit information (six bits×four). The 64 (=$2^6$) kinds of patterns for embedding information may not be used as the position codes, and only 16 kinds of patterns may be used. In this case, the information amount per unit code pattern is four bits (16=$2^4$). Therefore, the position code has 16-bit information amount (four bits×four).

An M sequence (maximum length code) may be used as an example of position codes. For example, if a 12-order M sequence is used, the sequence length of the M sequence is 4094 (=$2^{12}$−1). If 16 kinds of patterns are selected as the unit code patterns for a position code, four-bit information can be stored in each unit code pattern. Thus, one code block contains four unit code patterns as a position code and can store 16-bit information (four bits×four). Therefore, the M sequence having the sequence length 4095 can be divided into 255 (=4095÷16) code blocks, which are then stored. Since the size of one side of one code block is 2.538 mm (=0.5076 mm/unit pattern×5), the length of the 255 consecutive code blocks becomes 647.19 mm. That is, the length of 647.19 mm can be coded. Coding can be executed up to A2-size (420 mm×594 mm) paper in terms of paper size.

Although one M sequence is used to encode positions by way of example, plural M sequence can be concatenated to furthermore increase the number of the positions that can be encoded. For example, in the case of using 11-order M sequence, four 11-order M sequences may be concatenated for encoding A0-size paper.

An information code where desired record information can be described is placed in the remaining area of the code block. Since 16 unit code patterns (four×four) can be placed in the area, 96-bit record information (six bits/unit code pattern×16) can be stored. Since the unit code pattern of the exemplary embodiment is a multilevel code, an error occurring during reading, etc., also may occur in units of the unit code patterns. Therefore, an error correction code method may be a method that can make an error correction in block units. If RS code (Reed-Solomon code) that is a known block error correction code method is used, the block length of the RS code can be set to six bits, which is the information amount of the unit code pattern. In this case, the code length of the RS code becomes 16 blocks (=96 bits÷6 bits/block). For example, if a three-block correction capability is provided, the information code length of the RS code becomes 10 blocks (=16 blocks−three blocks×2). In this case, 60-bit information (=six bits/block×10 blocks) can be embedded in the information code area.

<Configuration of Latent Image for Checking Paper Being Copied>

Next, the configuration of a latent image for checking paper being copied will be described.

In the exemplary embodiment, a latent image for checking paper being copied described later is formed on a sheet of paper as a latent image together with the code block described above. If the sheet of paper having a latent image for checking paper being copied formed thereon is copied with a copier, the latent image for checking paper being copied appears on the copy paper, so that the copy can be visually identified.

To form such a latent image for checking paper being copied, it is necessary to realize such a characteristic that if unit code patterns that are an image pattern of a code block are reproduced without disappearing and the latent image for checking paper being copied disappears and is not reproduced, or that although unit code patterns disappear, the latent image for checking paper being copied is reproduced without disappearing. Then, in the exemplary embodiment, the latent image for checking paper being copied is formed of a predetermined pattern image including one or more dots and a size of each of the dots forming the pattern image for the latent image for checking paper being copied is different from a size of each dot used in the unit code pattern.

Figure 5A:
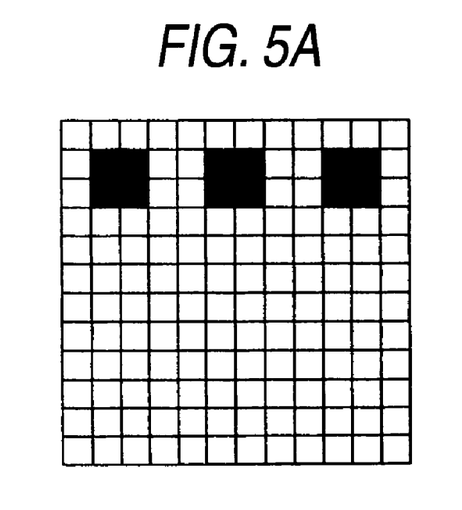
FIG. 5 is a drawing to show examples of pattern images for a latent image for checking paper being copied in the exemplary embodiment of the invention.
Figure 5B:
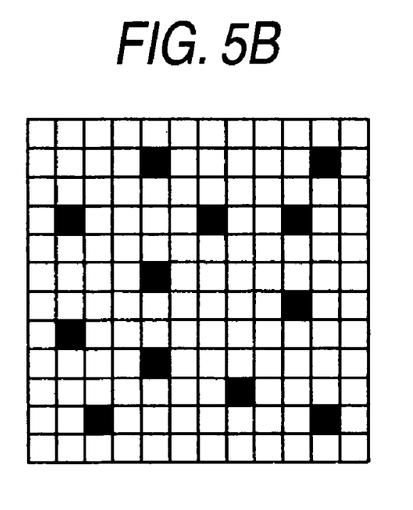
Figure 5C:
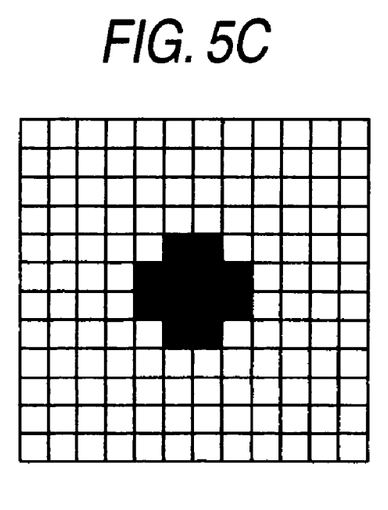

FIG. 5 is a drawing to show examples of pattern images for the latent image for checking paper being copied. FIG. 5A shows a unit code pattern and FIGS. 5B and 5C show pattern images used for the latent image for checking paper being copied. In FIGS. 5A to 5C, a lattice represents pixels in each pattern image. One cell represents one pixel.

As shown in FIG. 5, in the exemplary embodiment, a pattern image where dots smaller than the dots of the unit code pattern are placed and a pattern image where a dot larger than the dots of the unit code pattern is placed are provided as the pattern images for the latent image for checking paper being copied. The size of each dot of the unit code pattern shown in FIG. 5A is 2×2 pixels. On the other hand, dots each having a size of one pixel are placed in the pattern image shown in FIG. 5B, and a dot having a size of 12 pixels is placed in FIG. 5C.

When 600-dpi recording is executed, the size of the dot of 2×2 pixels used in the unit code pattern is 84.6 μm×84.6 μm as previously described with reference to FIG. 1. In contrast, the size of each dot in the pattern image shown in FIG. 5B is about φ42.3 μm, and the size of the dot in the pattern image shown in FIG. 5C is about φ169 μm.

In the case of copying an image with a copier, to exclude dust and dirt deposited on a paper face, an image smaller than a predetermined size is not reproduced. From the viewpoint of performance of copiers, it is difficult to reproduce an image smaller than a predetermined image because contrast between the image and the background becomes small. In contrast, a dot image larger than a predetermined size is likely to be an image, a character, or a part thereof (for example, a period "." or the like) and thus is reliably reproduced regardless of the print density. Although depending on the performance of a copier, generally a dot having a size of φ42 μm±20 μm or less will disappear when being copied and a dot having a size of φ125 μm or more is reliably reproduced when being copied. Therefore, the dots of the pattern image shown in FIG. 5B (which will be hereinafter referred to as "small dots")

disappear when being copied, and the dot of the pattern image shown in FIG. 5C (which will be hereinafter referred to as a "large dot") is reliably reproduced when being copied.

By the way, in the case of forming the pattern images on a sheet of paper, to embed a latent image for checking paper being copied as a latent image, it is necessary to make the overall density of an area where the different pattern images are placed, be uniform. Thus, the numbers of pixels (numbers of black pixels) used in the pattern images rendered to be identical or almost identical. In the example shown in FIG. 5, each of the numbers of pixels used in the pattern images is 12. Therefore, if the pattern images are placed on a sheet of paper and a latent image for checking paper being copied is formed of small and large dots, the macroscopic density does not change between the background where the code pattern image is placed and an area where the latent image for checking paper being copied is placed. It is difficult to macroscopically distinguish the latent image for checking paper being copied.

Figure 6A:
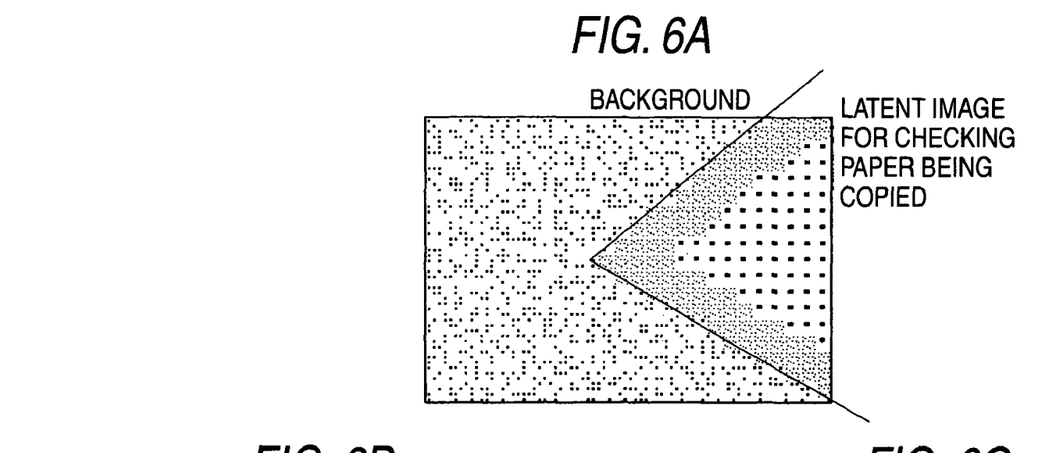
FIG. 6 is a drawing to show a configuration example of the latent image for checking paper being copied having small and large dots according to the exemplary embodiment of the invention.
Figure 6B:
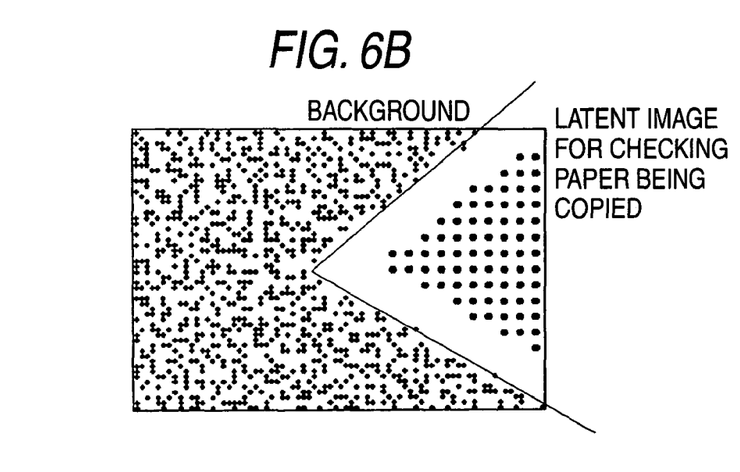
Figure 6C:
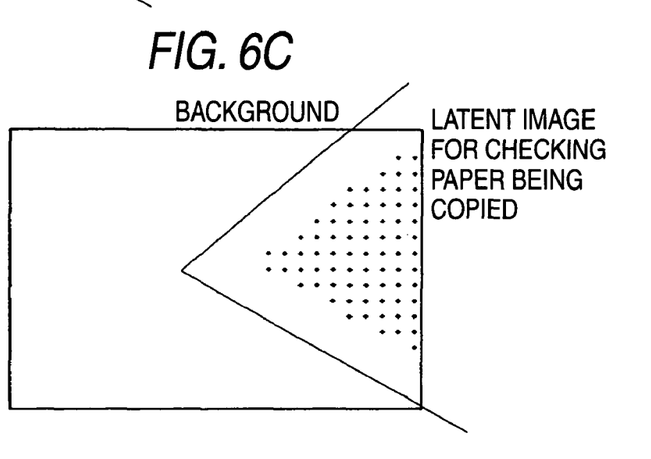

FIG. 6 is a drawing to show a configuration example of the latent image for checking paper being copied having small and large dots described above. FIG. 6A shows an image formed of a code pattern image and the latent image for checking paper being copied. FIG. 6B shows an image indicating a copy state of the image shown in FIG. 6A. FIG. 6C shows an image indicating a copy state of the image shown in FIG. 6A at a low density to such an extent that the code pattern image disappears.

Referring to FIG. 6A, in the latent image for checking paper being copied drawn with the small and large dots, the small dots are placed like a belt having a predetermined width in a boundary portion between the area where the code pattern image is formed and the area where the large dots are placed. If the image shown in FIG. 6A is copied with a copier, the small dots are not reproduced and thus dots are dropped along the edge of the latent image for checking paper being copied as shown in FIG. 6B. The outline of the latent image for checking paper being copied appears recognizably. In the example shown in FIG. 6B, the image is copied at a high density to reliably reproduce the code pattern image still after copy. However, since the small dots are not reproduced by the copying process regardless of a density setting in copying, a similar results is achieved.

In contrast, if the image is copied at a low density to such an extent that the code pattern image disappears by the copying process, the code pattern image disappears as well as the small dots. Thus, only the large dots remain as shown in FIG. 6C and the latent image for checking paper being copied appears recognizably. If the image is copied at a low density, the density of the area where the large dots are placed also lowers, but dots are completely disappear in the other areas. Therefore, the density difference becomes clear and visual recognition is facilitated.

Figure 7A:
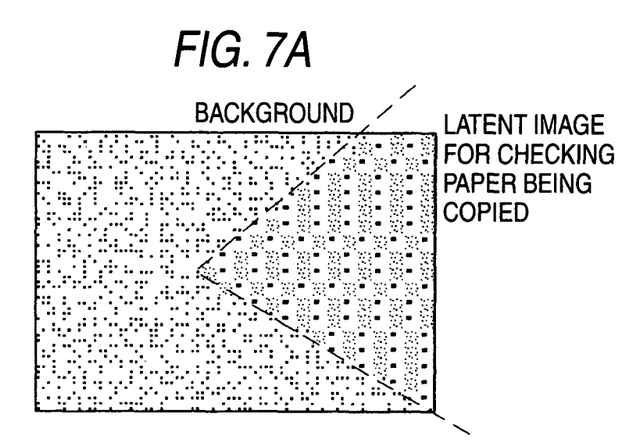
FIG. 7 is a drawing to show another configuration example of the latent image for checking paper being copied having small and large dots according to the exemplary embodiment of the invention.
Figure 7B:
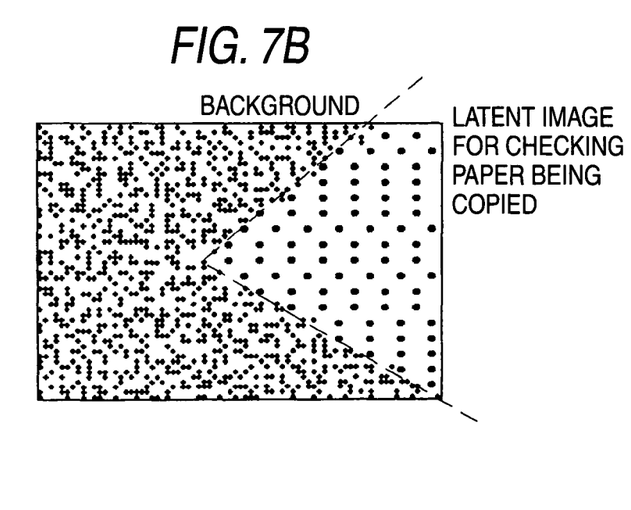
Figure 7C:
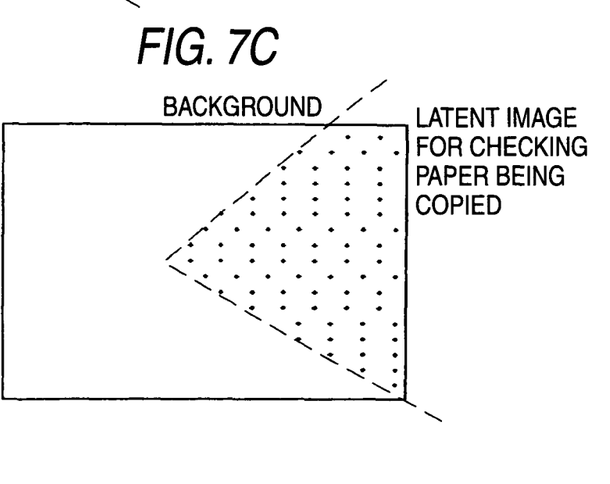

FIG. 7 is a drawing to show another configuration example of the latent image for checking paper being copied having small and large dots described above. FIG. 7A shows an image formed of a code pattern image and the latent image for checking paper being copied. FIG. 7B shows an image indicating a copy state of the image in shown FIG. 7A. FIG. 7C shows an image indicating a copy state of the image shown in FIG. 7A at a low density to such an extent that the code pattern image disappears.

Referring to FIG. 7A, the latent image for checking paper being copied is drawn with the small and large dots mixed. If the image is copied with a copier, the small dots are not reproduced and the density of a portion of the latent image for checking paper being copied lowers as shown in FIG. 7B, and the latent image for checking paper being copied appears recognizably. In the example shown in FIG. 7B, the image is copied at a high density to reliably reproduce the code pattern image still after copy. However, a similar result is achieved because the small dots are not reproduced by the copying process regardless of the density setting in copying.

In contrast, if the image is copied at a low density to such an extent that the code pattern image disappears by copy, the code pattern image is not reproduced as well as the small dots. Thus, only the large dots remain as shown in FIG. 7C, and the latent image for checking paper being copied appears recognizably. If the image is copied at a low density, the density of an area where the large dots are placed also lowers, but dots are completely disappear in the other areas. Therefore, the density difference becomes clear and visual recognition is facilitated.

Figures 8A, 8B, 8C:
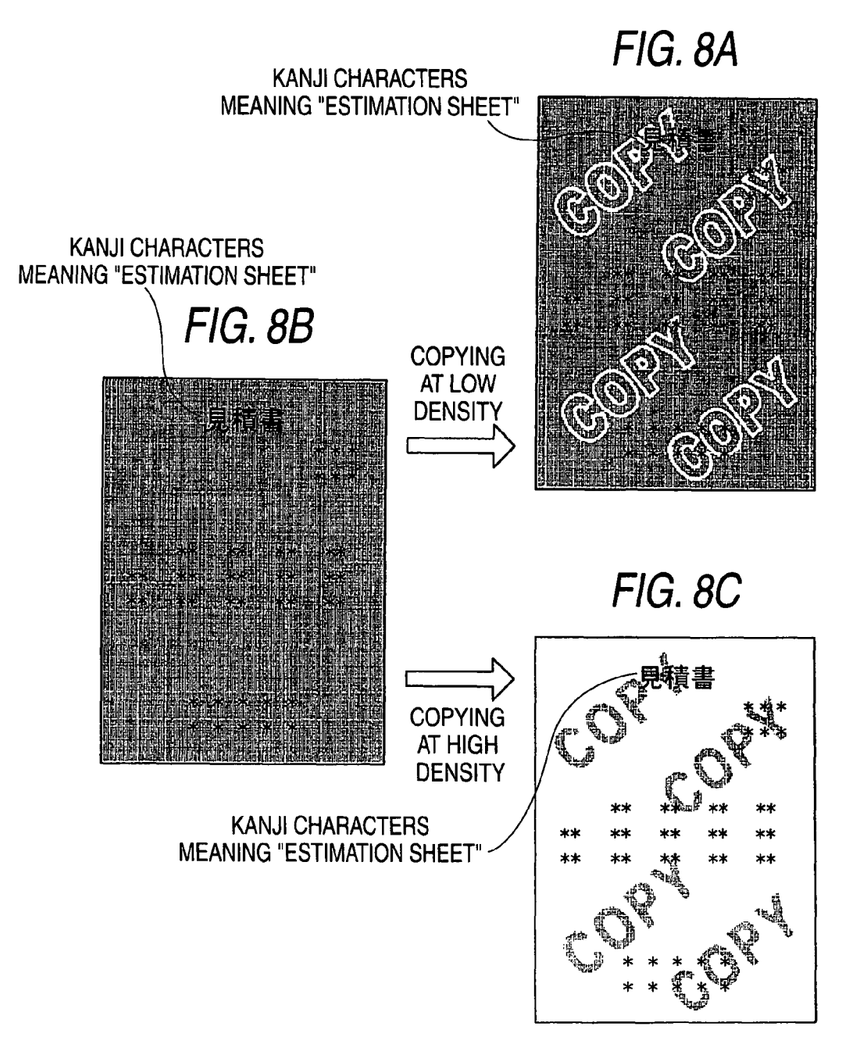
FIG. 8 is a drawing to show examples of print documents formed of a latent image for checking paper being copied according to the exemplary embodiment of the invention.

FIG. 8 is a drawing to show examples of print documents formed of a latent image for checking paper being copied according to the technique shown in FIG. 6. FIG. 8A shows a state in which a code pattern image and a latent image for checking paper being copied are formed on an estimate sheet. FIG. 8B shows a state in which the estimate sheet shown in FIG. 8A is copied (at a high density). FIG. 8C shows a state in which the estimate sheet in FIG. 8A is copied at a low density.

As shown in FIGS. 8B and 8C, the latent image for checking paper being copied designed like a character string of "COPY" is formed on the paper. Thus, if the estimate sheet is copied, small dots disappear and the latent image for checking paper being copied edged with white appears. If the estimate sheet is copied at a low density, the small dots and the code pattern image disappear and the latent image for checking paper being copied drawn with large dots placed on a white background appears.

<Generation Process of Latent Image for Checking Paper being Copied>

By the way, it is considered that a character string representing that a document is a duplicate is often used as a latent image for checking paper being copied. In this case, the character string may be acquired as text data and may be converted into an image to be used. For the text used as the latent image for checking paper being copied, a font of a comparatively large point size (for example, 48 points) is set so as to easily visually recognize that the latent image for checking paper being copied appears when copying. The character image generated from the text is converted into a binary image so as to satisfy relations of the following expressions (1) and (2).

Resolution of character image=print resolution÷number of pixels, in width, of pattern image        (1)

Number of pixels in height by pixels in width of character image=number of pixels in height by pixels in width of document image÷number of pixels in width of pattern image        (2)

Here, the print resolution represents the resolution of an image formation apparatus for printing out the latent image for checking paper being copied on a sheet of paper, the number of pixels in width represents a length of one side when a pattern image is formed like a square as shown in FIG. 5, and the number of pixels in height by pixels in width of document image represents a size of the print document printed on a sheet of paper together with the latent image for checking paper being copied and the code pattern image.

For example, it is assumed that the print resolution is 600 dpi and the number of pixels in width of pattern image is 12 pixels and the number of pixels in height by pixels in width of document image data is 4960×7015. In this case, a resolution of the character image is 50 dpi and the number of pixels in height by pixels in width is 413×584. That is, setting is made so that one pixel of the character image corresponds to the size of one pattern image.

<Image Generation Apparatus>

Next, an image generation apparatus 100 for generating the code pattern image and the latent image for checking paper being copied described above will be described.

Figure 9:
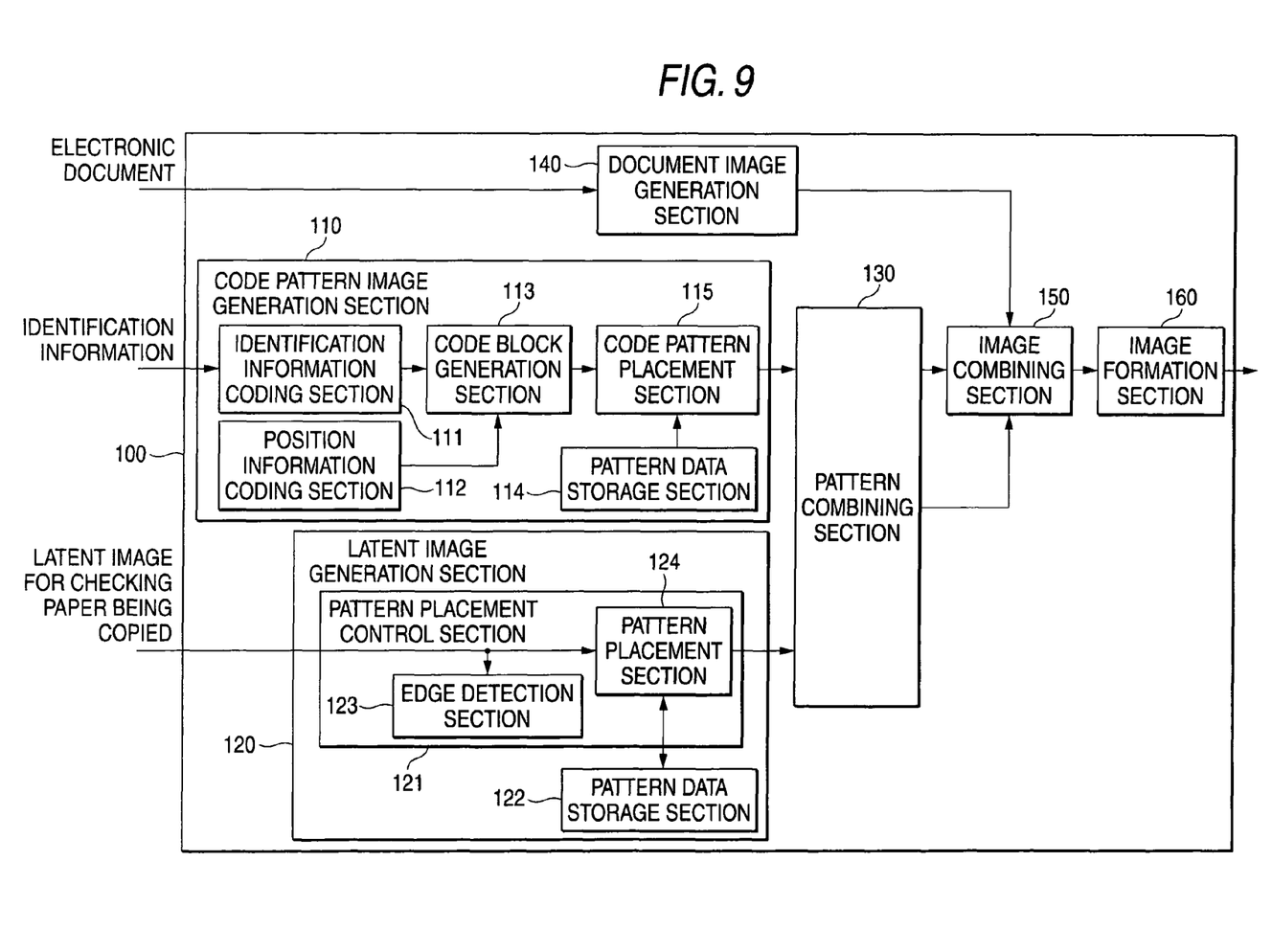
FIG. 9 is a block diagram to show the configuration of an image generation apparatus according to the exemplary embodiment of the invention.

FIG. 9 is a block diagram to show the configuration of the image generation apparatus 100 according to the exemplary embodiment.

As shown in FIG. 9, the image generation apparatus 100 according to the exemplary embodiment includes a code pattern image generation section 110, a latent image generation section 120, a pattern combining section 130, a document image generation section 140, an image combining section 150, and an image formation section 160. These sections are implemented as a program-controlled CPU (Central Processing Unit) or a storage device such as semiconductor memory and a magnetic disk unit installed in a computer such as a personal computer or an image formation apparatus.

The code pattern image generation section 110 includes an identification information coding section 111, a position information coding section 112, a code block generation section 113, a pattern data storage section 114, and a code pattern placement section 115.

The identification information coding section 111 acquires and encodes identification information (ID) to identify a sheet of paper or a document to be printed on paper, so as to generate an information code. As a coding system, for example, the RS coding, which is an error correction code system, may be used as described above.

The position information coding section 112 encodes position information unique to a position on the sheet of paper to generate a position code. Here, the Cartesian coordinate system (X-Y coordinate system) is assumed on the sheet of paper, and the position is represented by the coordinate values. For example, the above M sequence may be used for coding.

The code block generation section 113 combines the information code generated by the identification information coding section 111, the position code generated by the position information coding section 112, and a synchronous code that facilitates positioning of a code block and extracting of the code block, so as to generate the code block. The code block generation section 113 also places the code block in a virtual two-dimensional space corresponding to the paper surface.

The pattern data storage section 114 is implemented as a nonvolatile memory or a magnetic disk unit, for storing data of unit code patterns used as the information code, the position code, and the synchronous code.

Based on various codes which form the code block which are placed by the code block generation section 113, the code pattern placement section 115 reads appropriate unit code patterns representing values of the codes from the pattern data storage section 114, and places the unit code patterns in the virtual two-dimensional space so as to generate a code plane.

The latent image generation section 120 includes a pattern placement control section 121 and a pattern data storage section 122.

The pattern placement control section 121 includes an edge detection section 123 and a pattern placement section 124. The pattern placement control section 121 receives image data of a latent image for checking paper being copied and represents the latent image for checking paper being copied by placement of pattern images formed of small dots and large dots.

The pattern data storage section 122 stores data of a pattern image having small dots and data of a pattern image having large dots. The small dots and the large dots form the latent image for checking paper being copied.

The edge detection section 123 analyzes the received latent image for checking paper being copied and detects an edge portion. As a edge detection technique, a known technique such as a technique of referring to a differential image of a target image may be used appropriately. In the case of generating the latent image for checking paper being copied in which small-dot images and large-dot pattern images are mixed as shown in FIG. 7, the edge detection section 123 may not be provided.

The pattern placement section 124 places the small-dot pattern image in the edge portion of the latent image for checking paper being copied detected by the edge detection section 123 and places the large-dot pattern image in the other areas.

The pattern combining section 130 combines the code plane generated by the code pattern image generation section 110 and placement information of the pattern images generated by the latent image generation section 120 so as to generate a background image containing the latent image for checking paper being copied. In the exemplary embodiment, in the code plane where the unit code patterns are placed, the unit code patterns at the position where the pattern of the latent image for checking paper being copied is placed are replaced by the latent image for checking paper being copied pattern (small-dot pattern of large-dot pattern).

The document image generation section 140 receives data of a print document (electronic document) to be printed on paper and generates a binary raster image.

The image combining section 150 superposes the background image generated by the pattern combining section 130 and the document image generated by the document image generation section 140 on each other.

The image formation section 160 prints out the document image on which the background image is superposed by the image combining section 150 on paper. Although not shown in FIG. 9, the image formation section 160 is implemented as a printer installing a printer engine such as Xerography engine, for example.

The data of the print document, the data of the identification information, the position information, and the latent image for checking paper being copied recorded as information code, and the like may be input from an external unit through a network interface, etc., or may be previously retained in storage of the magnetic disk unit, etc., provided in the image generation apparatus 100 and may be read when processing is executed.

In the configuration described above, the image generation apparatus 100 contains the image formation section 160, but the document image on which the background image is superposed by the image combining section 150 may be transmitted to an external printer for printout.

In the example described above, identification information of paper or a document printed on paper is coded as information code, but the invention is not limited to the mode. In addition to the identification information, any information such as control information for a device reading a code pattern image can be coded and can be recorded as a code pattern image.

What is claimed is:

1. An image generation apparatus comprising:
an information acquisition section that acquires record information to be recorded on a recording medium; and
an image generation section that generates an image comprising code pattern images and a latent image for checking paper being copied, the code pattern image representing the record information acquired by the information acquisition section, the latent image for checking paper being copied including second pattern images each having a smaller size than each code pattern image and third pattern images each having a larger size than each code pattern image;
wherein the image generation section replaces the code pattern images placed in an area where the latent image for checking paper being copied is formed, by at least ones of the second pattern images and the third pattern images so as to generate the latent image for checking paper being copied.

2. The apparatus according to claim 1, wherein the image generation section generates the latent image for checking paper being copied so that the second pattern images and the third pattern images edge each other.

3. The apparatus according to claim 1, wherein the image generation section mixes the second pattern images and the third pattern images in an area where the latent image for checking paper being copied is formed.

4. The apparatus according to claim 1, wherein:
each second pattern image has a size to allow each second pattern image to disappear when each second pattern image is copied, and
each third pattern image has a size not to allow each third pattern image to disappear when each third pattern image is copied.

5. A non-transitory computer readable recording medium storing a computer readable program data executable by a computer for causing a computer to execute a process for drawing a pattern image on a surface of a piece of paper, the pattern image comprising:
first pattern images handled as a code representing information;
second pattern images each having a smaller size than each first pattern image; and
third pattern images each having a larger size than each first pattern image, the second pattern images and the third pattern images forming a latent image for checking paper being copied;
wherein an image generation section replaces first pattern images placed in an area where the latent image for checking paper being copied is formed, by at least ones of the second pattern images and the third pattern images so as to generate the latent image for checking paper being copied.

6. The recording medium according to claim 5, wherein the second pattern images and the third pattern images edge each other to form the latent image for checking paper being copied.

* * * * *